Jan. 24, 1933.  W. M. BROWER  1,894,976

DIAL ENGRAVING MACHINE

Filed July 11, 1929  2 Sheets-Sheet 1

Inventor
William M. Brower
By Cornelius D. Ehret
his Attorney.

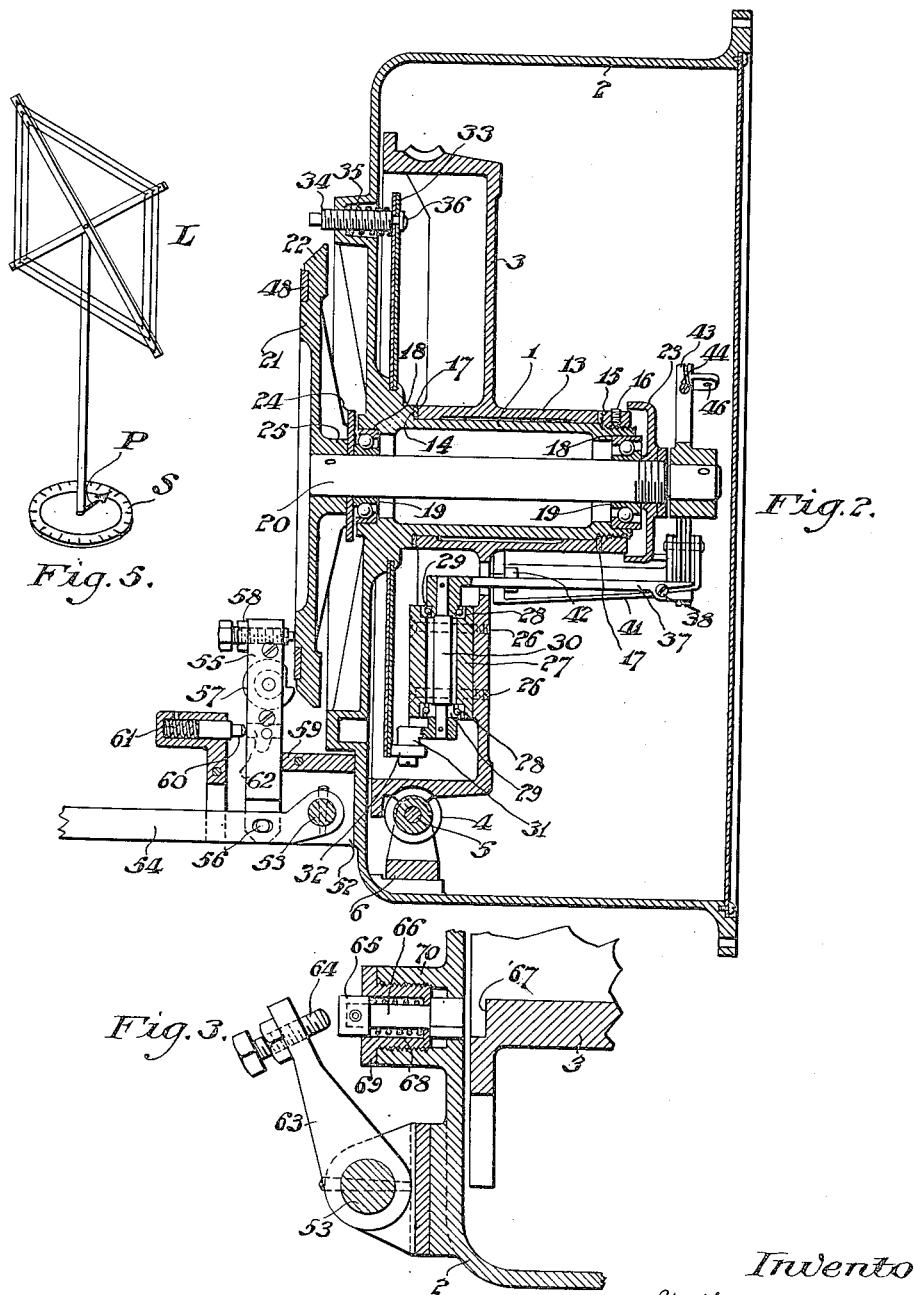

Patented Jan. 24, 1933

1,894,976

UNITED STATES PATENT OFFICE

WILLIAM M. BROWER, OF PALO ALTO, CALIFORNIA, ASSIGNOR TO FEDERAL TELEGRAPH COMPANY, OF SAN FRANCISCO, CALIFORNIA, A CORPORATION OF CALIFORNIA

DIAL ENGRAVING MACHINE

Application filed July 11, 1929. Serial No. 377,371.

My invention relates to apparatus for calibrating a radio compass scale correctly to indicate the direction of a source of electro-radiant energy despite distortion of the wave front thereof, as by masses adjacent the absorption structure of the compass.

In accordance with my invention, a blank radio compass scale is moved in unison with a uniformly divided scale, between which and a second uniformly divided scale, there continuously exists a difference in reading corresponding in extent and sense to previously determined wave-front distortion error, and the compass scale blank is marked, as by an engraving tool, in accordance with the second scale, the graduations thus formed being non-uniformly spaced.

Further in accordance with my invention and more specifically, a cam, preferably a distortable disc or ring, deformed in accordance with wave front distortion, controls the extent and sense of relative movement between the uniformly divided scales.

My invention further resides in features of arrangement and construction hereinafter described and claimed.

For an illustration of one of the forms of my invention, reference is to be had to the accompanying drawings, in which:

Fig. 2 is a side elevational view with parts in section, of mechanism shown in Fig. 1.

Fig. 3 is a detailed view on an enlarged scale, and partly in section, of parts shown in Fig. 1.

Fig. 5 in perspective, represents the rotatable direction-finding coil and associated scale of one type of direction-finding apparatus.

Figure 1:
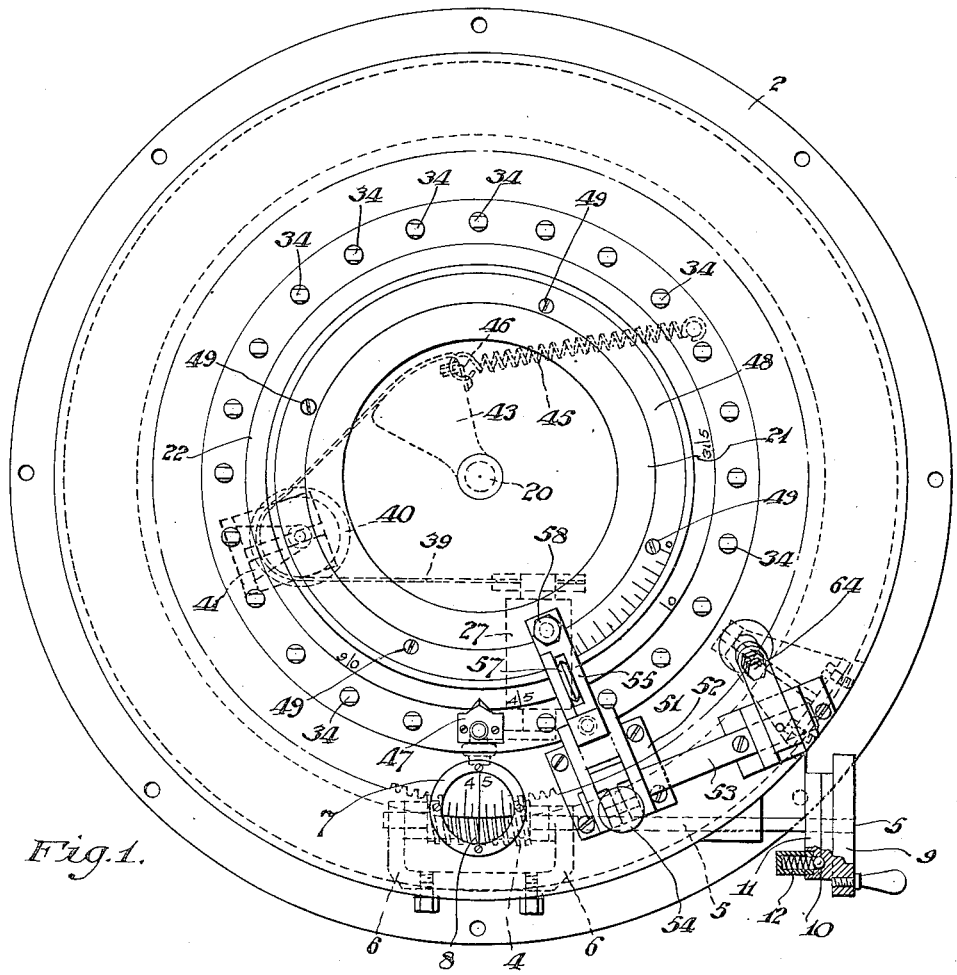
Fig. 1 is a plan view of apparatus for calibrating a radio compass scale.

Referring to Fig. 2, on the hollow bearing member 1, extending inwardly from and preferably integral with housing 2, is rotatably mounted a gear structure 3 meshing with a worm 4 mounted upon and attached to a shaft 5 supported by the bracket member 6, and extending exteriorly of the housing 2, Fig. 1. On the face of the gear member 3 is engraved a degree scale, visible through a window 7, in the front face of the housing 2 with which there is associated a sight wire 8 or other suitable index or pointer. For simplicity and clarity only the major graduations are shown. Preferably the ratio of the gearing is such that one revolution of the handle 9 attached to shaft 5 effects movement of the ring gear through one degree, the handle 9 being retained in its adjusted position by any suitable means, for example, by a ball 10 suitably mounted within a stationary support 11, and forced into an indentation of the handwheel 9 by a spring 12.

The hub or hollow shaft portion 13 of the ring gear abuts at one end a shoulder portion 14 of the bearing member 1, and at its other end is engaged by a ring 15 threadably engaging the end of bearing member 1 and held thereon in adjusted position as by locking screw 16. If desired and as shown, washers 17 may be interposed between the ends of the hub portion 13 and the cooperating bearing surfaces. At its opposite ends the hollow bearing member 1 receives the outside races 18 of the ball bearings 19 to rotatably support a shaft 20, to one end of which and exteriorly of casing 2 is secured a plate member 21 whose beveled edge 22 is suitably engraved or marked in degrees. Axial movement of shaft 20 is precluded by adjustment of member 23 threadably engaging the inner end of shaft 20 and abutting the adjacent face of the inner race of the ball bearing 19, a locking nut or equivalent, holding the member 23 in adjusted position. Preferably, and as shown, a spacing washer 24 is interposed between hub portion 25 of the scale or plate 21 and the forward bearing 19.

Within the gear 3 and to the inner face thereof there is suitably attached, as by bolts 26 a hollow supporting member 27 receiving at its opposite ends the outer races 28 of ball bearings 29 which support a shaft 30. To the lower end of the shaft, as viewed in Fig. 2, there is attached an arm 31 carrying a roller 32 which engages a deformable disc 33, whose inner edge is secured to casing 2 concentric with gear 3 and the outer scale member 21. At spaced points about its periphery, the deformable disc 33, preferably laminated, is engaged by a plurality of screws 34 threadably engaging the housing 2. A helical spring 35 surrounding each adjusting screw 34 forces the plate 33 against a shoulder 36 of the adjusting screw or formed by a member extending through the disc and attached to the screw.

To the other, or upper end of cam-follower shaft 30 as viewed in Fig. 2, is attached an arm 37 to the outer end of which is attached as by screw 38, a cable 39, of wire, cord or the like, which passes over a pulley 40 mounted upon a bracket 41 secured to ring gear 3 as by screws or bolts 42, and which is secured to an arm 43 as by clamping screw 44, mounted upon the inner end of shaft 20. A spring 45 one of whose ends engages the lug 46 of arm 43, and whose other end is suitably secured to ring gear 3, constantly biases the roller 32 into engagement with the deformable disc 33. Assuming that the disc 33 is not deformed, that the zero of the scale upon the ring gear is brought opposite sight wire 8, and the zero of the scale 22 is brought opposite a suitable pointer 47, rotation of shaft 5 by the handle 9, effects movement of both scales to like extents so that for all positions of the inner scale upon the ring gear 3, the readings of both the inner and outer scales will correspond. Distortion of the disc 33 by adjustment of screws 34 in one direction or the other, permits or causes arm 31 to which is attached the cam follow 32 to move about its axis, and effects relative movement between the inner and outer scales. In some of its structural aspects, the mechanism is generally similar to that described and claimed in my Patent No. 1,767,117, filed June 24, 1930.

Figure 4:
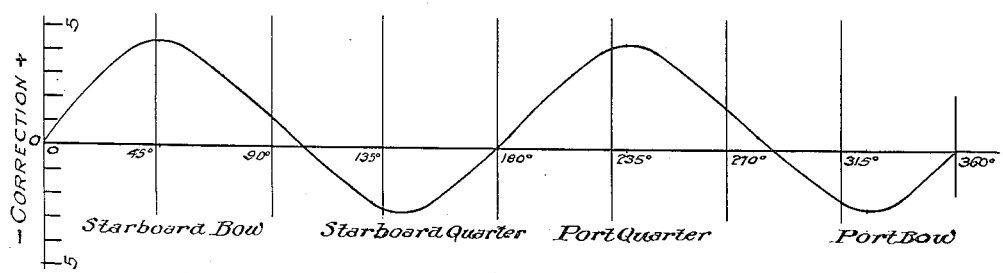
Fig. 4 is an explanatory diagram.

To calibrate a scale for a radio compass aboard ship, for example, the direction-finding coil or loop L, Fig. 5, is rotated to point of critical response and the position of pointer P with respect to a uniformly divided scale S noted and checked against a sight bearing on the same transmitting station, or source of electro-radiant energy. The differences between the two bearings, as the ship circles, may be plotted, giving a curve such as shown in Fig. 4, for example.

A blank compass scale 48 is attached to the outer scale member or plate 21 by screws 49 which hold it securely in position in the groove 50. The holes for the screws are accurately drilled by template to insure that all scales calibrated by the apparatus are interchangeable.

In setting the deformable cam, the procedure is to set the handle 9 so that the zero of the inner scale on ring gear 3 is opposite its index. The cam is then deformed until the reading on the outer scale 22 is either zero or plus or minus zero according to the correction curve. The lower scale is then moved to suitable extent, for example, 15 degrees, in the apparatus shown, since the adjusting screws 34 are 15 degrees apart, and the cam is again deformed according to the correction curve. The procedure is repeated until the entire periphery of the cam has been shaped in accordance with the wave front distortion, that is, to compensate for the differences between the radio compass and sight bearings previously taken due to the mass of the ship. When this is done the cutting of the new scale may be begun.

To the outer face of the housing 2 is secured, as by screws 51, a bracket member 52 supporting a shaft 53 to which is attached an operating lever 54 for the engraving mechanism. A bar 55 having a lost-motion connection at 56 with lever 54 carries the engraving tool 57. As the lever 54 is moved in clockwise direction as viewed in Fig. 2, the bar 55 guided by the end of adjustable screw 58, the cross member 59 of a supporting bracket 52, and the resilient plunger 60, moves upwardly in a rectilinear path, the engraving tool 57 cutting a graduation upon the blank scale 48.

When the arm 54 is restored to its original position, the plunger 60 under the influence of its biasing spring 61 moves into an aperture 62 of arm 55, relieving the pressure thereon and permitting free movement of the outer scale member 21. In the absence of such a provision the deformable cam may not be sufficiently strong to overcome the friction on the upper surface of the outer scale plate 21.

To provide for different lengths of the engraved graduations, to an extension of shaft 53 there is attached an arm 63, see Fig. 3, through the free end of which passes an adjustable screw stop 64. As the operating lever 54 is rotated to cut the compass scale blank 48, the stop 64 engages a cap 65 secured to one end of a plunger 66 whose other end is adapted to engage recesses 67 of different depths, in the face of gear 3. Recesses corresponding to the 10 degree divisions, for example, of the scale are deeper to permit greater extent of rotation of the operating lever 54 and therefore greater rectilinear movement of the engraving tool 57. The five degree and one degree recesses may be of suitably lesser depth to produce shorter movement of the engraving tool 57. As shown, the plunger 66 is biased to position out of engagement with recesses 67 by a spring 68 engaging the head 65 and a shoulder of the plug 69 threadably engaging a boss 70 integral with the front wall of the housing 2.

After the deformable member 33 has been adjusted as previously described, and the blank scale 48 is in position, to effect engraving thereof, it is only necessary to rotate the handle 9 to effect registry between the graduations of the inner scale and the index or sight wire 8, and operate the engraving tool lever 54. The unequal spacing of the graduations of the corrected scale, and the different lengths of the graduations are automatically effected by the apparatus described.

After the blank 48 has been completely calibrated to comprise a corrected radio compass scale, it replaces the uniformly divided scale S, Fig. 5. Thereafter in the operation of the compass when the direction-finding coil L is moved to point or region of critical response, the bearing or direction of the source of electro-radiant energy is correctly indicated by the pointer P on the corrected scale.

What I claim is:

1. Apparatus for calibrating corrected scales comprising a bearing member, a rotatable member mounted upon said bearing member, a rotatable shaft supported by said bearing member, a graduated disc grooved to receive a scale blank mounted upon said shaft, a deformable cam, mechanism connecting said rotatable member and said shaft and permitting relative movement, and a cam follower carried by said rotatable member engaging said cam to control said relative movement.

2. Apparatus for calibrating corrected scales comprising a wall, a graduated disc disposed on one side of said wall, a rotatable member disposed on the other side of said wall and having graduations visible therethrough, a deformable cam disc of greater diameter than said graduated disc disposed on said other side of said wall, and cam distorting member engaging said cam adjacent the periphery thereof and extending through said wall, adjustable to control relative movement of said graduated disc and rotatable member.

3. Apparatus for calibrating corrected scales comprising, two graduated members, adjustable means controlling relative movement of said members, means supporting a scale blank for movement in unison with one of said members, and mechanism for marking said blank with scale markings corresponding to the markings on the other of said members but displaced therefrom by the amount of said relative movement.

4. Apparatus for calibrating corrected scales comprising, two graduated members, indices therefor, adjustable means controlling relative movement of said members, means supporting a scale blank for movement in unison with one of said members, and a tool having a fixed path of movement with respect to said indices, for marking said blank with scale markings corresponding to the markings on the other of said members.

5. Apparatus for calibrating corrected scales comprising, two graduated members, a deformable cam structure controlling relative movement thereof, means for supporting a scale blank for movement in unison with one of said members, a marking tool, guiding structure therefor engaging said one of said members, and means relieving pressure of said structure upon said one of said members when said blank is not engaged by said tool.

6. Apparatus for calibrating corrected scales comprising, two graduated members, adjustable means controlling relative movement of said members, means supporting a scale blank for movement in unison with one of said members, and a marking tool adapted to engage said blank movable in a path to extents determined by the position of the other of said members.

7. Apparatus for calibrating corrected scales comprising, two graduated members, adjustable means controlling relative movement of said members, means supporting a scale blank for movement in unison with one of said members, and a marking tool adapted to engage said blank, and a structure movable simultaneously therewith and cooperating with the other of said members to determine the lengths of the graduations of the blank.

8. Apparatus for calibrating corrected scales comprising, a rotatable member adapted to support a scale blank, a marking tool, guiding structure therefor engaging said member, and means relieving pressure of said structure upon said member when said blank is not engaged by said tool.

9. Apparatus for calibrating corrected scales comprising a rotatable member adapted to support a scale blank, a marking tool adapted to engage said blank, a second rotatable member, and means movable with said marking tool cooperating with recesses in said second rotatable member to determine the lengths of graduations of the blank.

10. Apparatus for producing corrected scales comprising a master scale having a plurality of differently characterized graduations, a scale blank supporting member and a scale blank mounted thereon, marking means for producing graduations on said scale blank, means auxiliary to said marking means cooperating with said master scale and controlled thereby, for determining the character of the graduations produced by said marking means, means for proportionately moving said master scale relative to said auxiliary means and said scale blank relative to said marking means, and correcting means for producing additional displacement of said scale blank relative to said marking means.

11. Apparatus for producing corrected scales comprising two similarly graduated scale members, corresponding portions of which are normally juxtaposed to each other and the first of which carries a scale blank to be marked, scribing means movable with respect to said members for producing on said blank the graduation juxtaposed thereto on said second member, adjustable correction means for shifting one of said members relative to the other by a desired amount in one position of said second member relative to said scribing means, a second adjustable correcting means for similarly relatively shifting said members a different desired amount in another position of said second member relative to said scribing means, and means for continuously changing the relative positions of said members as said second member is moved between said two positions.

12. Apparatus for calibrating corrected scales comprising, two members, adjustable means controlling relative movement of said members, one of said members being provided with uniform graduations, means supporting a scale blank for movement in unison with the other of said members, and a mechanism for marking said blank with scale markings corresponding to the markings on the other of said members but displaced therefrom by the amount of said relative movement.

WILLIAM M. BROWER.